United States Patent [19]

Lindner et al.

[11] 4,376,843

[45] Mar. 15, 1983

[54] NOTCHED IMPACT RESISTANT VINYL CHLORIDE POLYMERS

[75] Inventors: Christian Lindner; Hans-Eberhard Braese, both of Cologne; Karl-Heinz Ott, Leverkusen, all of Fed. Rep. of Germany

[73] Assignee: Bayer Aktiengesellschaft, Leverkusen, Fed. Rep. of Germany

[21] Appl. No.: 270,802

[22] Filed: Jun. 5, 1981

[30] Foreign Application Priority Data

Jun. 14, 1980 [DE] Fed. Rep. of Germany ....... 3022469

[51] Int. Cl.$^3$ .............................................. C08L 51/04
[52] U.S. Cl. ........................................ 525/83; 525/76; 525/84
[58] Field of Search ............................... 525/76, 83, 84

[56] References Cited

U.S. PATENT DOCUMENTS

| | | | |
|---|---|---|---|
| 3,018,268 | 1/1962 | Daly | 525/84 |
| 3,445,416 | 5/1969 | Condo | 525/84 |
| 3,636,138 | 1/1972 | Beer | 525/84 |
| 3,644,249 | 2/1972 | Ide et al. | 260/23.7 R |
| 3,651,177 | 3/1972 | Saito | 525/84 |
| 3,907,928 | 9/1975 | Kumabe et al. | 260/876 R |
| 3,956,424 | 5/1976 | Murayama | 525/76 |
| 3,959,895 | 6/1976 | Lonning | 525/84 |
| 3,994,991 | 11/1976 | Okami et al. | 260/876 R |
| 4,041,106 | 8/1977 | Ide | 525/84 |
| 4,078,018 | 3/1978 | Chauvel | 525/83 |

FOREIGN PATENT DOCUMENTS

1039802  8/1966  United Kingdom .

*Primary Examiner*—Paul Lieberman
*Attorney, Agent, or Firm*—Connolly and Hutz

[57] ABSTRACT

The invention relates to notched impact resistant thermoplastic moulding compositions obtained from 1. 1 to 99% by weight, preferably 10 to 95% by weight, especially 70 to 98% by weight, of a thermoplastic vinyl chloride polymer, and
2. 99 to 1% by weight, preferably 90 to 5% by weight, especially 2 to 30% by weight, or a particulate graft copolymer consisting of a nucleus (a) of a highly crosslinked diene rubber, a first covering (b) of a crosslinked acrylate rubber, and a second covering (c) of a polymer or copolymer of resin-forming monomers, viz. Styrene, α-methylstyrene, acrylonitrile, methacrylonitrile, acrylic acid esters and methacrylic acid esters.

2 Claims, No Drawings

NOTCHED IMPACT RESISTANT VINYL CHLORIDE POLYMERS

This invention relates to notched impact resistant thermoplastic moulding compositions obtained from a vinyl chloride polymer and particulate graft copolymers. Thermoplastic vinyl chloride polymer moulding compositions containing graft copolymers are known. According to German Offenlegungsschrift No. 2,010,633, grafted butadiene rubbers (ABS polymers) are used for the modification of polyvinyl chloride. Due to their high diene rubber content, such polymer mixtures are not resistant to weathering. Although modifiers for polyvinyl chloride based on acrylate rubber (see German Auslegeschrift No. 2,503,390 or British Pat. No. 1,002,813) improve the age resistance, the material characteristics at low temperatures and the working properties are unsatisfactory; for example, these modifiers are difficult to disperse in vinyl chloride polymers, with the result that their modifying properties are not fully effective.

This invention is based on the finding that moulding compositions which have good age resistance compared to analogous compositions containing polydienes and better low temperature characteristics than analogous compositions containing polyacrylates can be obtained from vinyl chloride polymers with the aid of certain particulate graft copolymers. These special graft polymers are readily dispersed in vinyl chloride polymers.

This invention thus provides notched impact resistant thermoplastic moulding compositions obtained from 1. 1.0 to 99% by weight, preferably 10.0 to 95.0% by weight, especially 70–98% by weight, of a thermoplastic vinyl chloride polymer, and
2. 99.0 to 1.0% by weight, preferably 90.0 to 5.0 % by weight, especially 2 to 30% by wt. of a particulate graft copolymer consisting of a nucleus (a) of a highly cross-linked diene rubber, a first covering (b) of a cross-linked acrylate rubber and a second covering (c) of a polymer or copolymer of resin-forming monomers, viz. styrene, α-methylstyrene, acrylonitrile, methacrylonitrile, acrylic acid esters and methacrylic acid esters.

Vinyl chloride polymers for the purpose of this invention include in particular polyvinyl chloride, copolymers of vinyl chloride with up to 20% by weight of copolymerisable compounds, and graft polymers of vinyl chloride on ethylene/vinyl acetate copolymers (in particular with vinyl chloride contents of 40 to 60% by weight). The following are examples of compounds which are copolymerisable with vinyl chloride:

(a) Vinyl esters having 1–8 C-atoms in the alkyl group of the carboxylic acid;
(b) vinyl ethers having 3–7 C-atoms;
(c) maleic acid anhydride;
(d) semiesters of maleic acid with aliphatic alcohols having 1–8 C-atoms in the alcohol group;
(e) diesters of maleic acid with aliphatic alcohols having 1–8 C-atoms in the alcohol group.

Particulate graft copolymers within the meaning of this invention are polymers consisting of a nucleus (a) of a highly cross-linked diene rubber, a first covering (b) of a cross-linked acrylate rubber and a second covering (c) of a copolymer or polymer of the resin forming monomers, styrene, α-methylstyrene, acrylonitrile, methacrylonitrile, acrylic acid and methacrylic acid esters.

The proportion by weight of the nucleus (a) to the first covering (b) is generally within the range of from 0.1:99.9 to 80:20, preferably from 10:90 to 50:50, and the proportion of (c) in the whole graft polymer is generally from 90 to 20% by weight, preferably from 80 to 50% by weight. The graft polymers generally have average particle diameters ($d_{50}$) of from 0.05 to 20$\mu$, preferably from 0.1 to 3$\mu$. Particle diameters from 0.1 to 1$\mu$ are particularly preferred.

The material of the nucleus (a) is a cross-linked rubber of one or more conjugated dienes such as butadiene or a copolymer of a conjugated diene with an ethylenically unsaturated monomer such as styrene and/or acrylonitrile.

The first covering (b) consists of a cross-linked acrylate rubber, in particular a cross-linked polymer of alkyl esters of acrylic acid, optionally in admixture with up to 40% by weight of other vinyl monomers. Suitable polymerisable acrylic acid esters include $C_1$–$C_8$ alkyl esters, for example methyl, ethyl, butyl, octyl and 2-ethylhexyl esters, halogen alkyl esters, preferably $C_1$–$C_8$ halogen alkyl esters such as chloroethyl acrylate, and aromatic esters such as benzyl acrylate and phenethylacrylate. They may be used singly or as mixtures which should contain at least one alkyl ester. For cross-linking, polyfunctional monomers are copolymerised. The following are examples: Esters of unsaturated carboxylic acids with a polyol (preferably having 2 to 20 carbon atoms in the ester group), such as ethylene glycol dimethacrylate, esters of a polybasic carboxylic acid with an unsaturated alcohol (preferably 8–30 carbon atoms in the ester group), such as triallyl cyanurate or triallyl isocyanurate, divinyl compounds such as divinylbenzene, esters of unsaturated carboxylic acids with unsaturated alcohols (preferably 6 to 12 carbon atoms in the ester group), such as allyl methacrylate; phosphoric acid esters, for example triallyl phosphate or 1,3,5-triacryloyl-hexahydro-s-triazine. The following polyfunctional monomers are particularly preferred: Triallyl cyanurate, triallyl isocyanurate, triallyl phosphate, allyl methacrylate, ethylene glycol dimethyacrylate and 1,3,5-triacryloyl-hexahydro-s-triazine.

The quantity of polyfunctional monomer used for cross-linking is preferably from 0.05 to 10% by weight, in particular from 0.1 to 5.0% by weight of the mass of the first covering (b). The elastomer of the first covering (b) may in addition contain a copolymerisable monomer or several such monomers of the vinyl or vinylidene type incorporated by polymerisation. Examples are: methyl methacrylate, butyl acrylate, acrylonitrile, styrene, α-methylstyrene, acrylamides and vinyl alkyl ethers. These comonomers may be incorporated by polymerisation in quantities of up to 50% by weight of polymer (b).

The second covering (c) is preferably a graft polymerised polymer of α-methylstyrene, styrene, acrylonitrile, methyl methacrylate or a copolymer of these monomers. Copolymers of styrene and acrylonitrile used in proportions by weight within the range of from 90:10 to 50:50 respectively and polymethyl methacrylate are particularly preferred.

The particulate graft copolymers may be prepared in aqueous emulsion as follows:

A conjugated diene of the diene rubber is first prepared for the nucleus (a) in the latex form by emulsion polymerisation. This method of polymerisation is known. The acrylate rubber for the first covering is then prepared in the presence of the diene rubber latex, again in aqueous emulsion, by emulsifying the monomers (main constituent at least one acrylate) in the latex and then polymerising in the presence of radical-forming initiators in known manner. The acrylate rubber polymerises on the diene rubber. By using polyfunctional monomers, it may already be cross-linked at the stage of preparation.

When carrying out this graft polymerisation of the first covering (b), the formation of new particles must as far as possible be completely prevented. An emulsion stabilizer must be present in a sufficient quantity to cover the surface of the particles. The size of the particles can be varied within wide limits by adjusting the reaction conditions. If an agglomerated latex is used as nucleus (a) in order to obtain larger particles, these may contain several diene rubber particles. Polymerisation of the first covering (b) may also be carried out in such a manner that particles having a diene rubber core and particles of pure cross-linked acrylate rubber are produced at the same time. Mixtures of this kind may in special circumstances also serve for the production of moulding compositions with high impact resistance.

After completion of graft polymerisation of the acrylate rubber, a vinyl monomer or a mixture of vinyl monomers is polymerised in emulsion on the latex obtained so that graft polymers are produced and the second covering (c) is formed. In this known graft polymerisation, which is normally carried out in the presence of radical starters such as water-soluble initiators, emulsifiers or complex formers/graft activators as well as regulators, a certain proportion of free polymers or copolymers of the monomers forming the second covering (c) are generally produced in addition to the graft polymer. The quantity of this ungrafted polymer may be characterised by the degree of grafting or the grafting yield and depends inter alia on the polymerisation conditions, the composition of the first covering (b), the size of the particles to be grafted and the quantity of grafted acrylate rubber. The "graft polymer" within the meaning of this invention is therefore the product obtained by the polymerisation of vinyl monomers in the presence of the rubber latex and thus strictly speaking a mixture of graft polymer and free copolymer of the graft monomers, regardless of the degree of grafting.

The graft polymers prepared in this manner may be worked up by known processes, e.g. by coagulation of the latices with electrolytes (salts, acids or mixtures thereof) followed by purification and drying or by so-called spray drying.

The moulding compositions according to the invention preferably contain up to 50% by weight of particulate graft copolymers, preferably up to 25% by weight thereof. Instead of the pure particulate graft copolymers, there may also be used mixtures of particulate graft copolymers with copolymers of the graft monomers (of covering (c)).

To prepare the moulding compositions according to the invention (a) latices of vinyl chloride polymers may be mixed with latices of the particulate graft copolymers and the two types of latices may then be coagulated together, or (b) the isolated vinyl chloride resin may be mixed in the thermoplastic state with the graft copolymers which are isolated from the aqueous emulsion.

The usual high speed mixers and rolling mills, for example, may be used for mixing, processing or compounding. The starting material used for these operations may be in pulverulent form, for example, or it may first be granulated. Compositions plasticised on rollers or kneaders may also be pressed or calendered. Powder mixtures and granulates may be extruded, injection moulded or blow moulded by known methods.

The moulding compositions according to the invention may contain the usual PVC stabilizers, i.e. stabilizing systems based on lead, barium/cadmium, calcium/zinc, organic tin compounds or organic stabilizers such as, for example, α-phenylindole, diphenyl-thiourea, α-aminocrotonic acid esters or epoxidised fatty acid esters, alone or in combination. Lubricants for polyvinyl chloride may also be added.

Polymer and monomer plasticizers, alone or in combination, may be added to the moulding compositions, as may also physical or chemical blowing agents for producing a foam structure under suitable operating conditions.

The usual processing agents and flow agents may be added in the same way as when processing pure or high impact resistant polyvinyl chloride. Antistatic agents, UV absorbents, antioxidants, flame protective agents, colour pigments and fillers may also be used.

The moulding compositions according to the invention may in addition also contain other known impact resistance modifiers, e.g. ethylene/vinyl acetate polymers, chlorinated polyolefines, ABS polymers or MBS polymers or known acrylate modifiers.

The moulding compositions according to the invention are primarily used for the manufacture of profiled sections and extruded plates as well as for injection moulded articles. Profiled sections are mainly used in the construction industry and furniture manufacturing industry, for example for window frames, door frames, balcony facings or the like. The injection moulding process may be used, for example, for the manufacture of household articles, small parts for the motor vehicle industry or, for example, furniture parts. Calendered foils may be used e.g. in the packaging industry and for the manufacture of wall coverings, claddings, facings or the like.

Examples of practical application

Preparation of the graft polymers 1.1 Preparation of the polydiene latices (nucleus (a))
1.1.1 The following emulsion is polymerised by stirring in a reactor at 65° C. for about 22 hours, until all the monomers have been virtually completely reacted;
90.0 parts by weight of butadiene
10.0 parts by weight of styrene
1.8 parts by weight of the sodium salt of disproportionated abietic acid
0.257 parts by weight of sodium hydroxide
0.3 parts by weight of n-dodecylmercaptan
1.029 parts by weight of Na-ethylenediaminotetraacetate
0.023 parts by weight of potassium persulphate and
176 parts by weight of water.

A latex is obtained, in which butadiene/styrene copolymer particles having an average diameter ($d_{50}$) of 0.1μ are contained at a concentration of about 35–36%.
1.1.2 Using the method of 1.1.1, the following emulsion is polymerised at 60°–68° C. within about 110 hours:
100.0 parts by weight of butadiene
70. parts by weight of water
1.146 parts by weight of the sodium salt of disproportioned abietic acid 0.055 parts by weight of Na-ethylenediaminotetracetic acid
0.137 parts by weight of sodium hydroxide
0.028 parts by weight of sodium bicarbonate
0.282 parts by weight of potassium persulphate.

The latex obtained contains polybutadiene particles with an average diameter ($d_{50}$) of 0.4μ at a concentration of about 58%.

1.2 Preparation of acrylate rubber particles containing polybutadiene nuclei (nucleus (a)) with 1 covering (b)

1.2.1 The following mixture is introduced into a reactor at 65° C. with stirring:
46 parts by weight of latex 1.1.1
2800 parts by weight of water
8 parts by weight of potassium persulphate.

The following mixtures are introduced separately into the reactor at 65° C. within 4 hours:
Mixture A:
3013 parts by weight of n-butyl acrylate
6.2 parts by weight of triallyl cyanurate
Mixture B:
2760 parts by weight of water
41 parts by weight of the sodium sulphonate of $C_{14}$–$C_{18}$ hydrocarbons.

Polymerisation is completed by heating for a further 4 hours at 65° C. The polymers formed have gel contents of 85-95% by weight, a degree of swelling of 5 to 9 and an average particle diameter of 0.4μ.

1.2.2 The following is introduced into a reactor at 65° C.:
2168 parts by weight of latex 1.1.2
9500 parts by weight of water
27 parts by weight of potassium persulphate
1700 parts by weight of water.

The following mixtures are introduced separately into the reactor at 65° C. within 4 hours:
Mixture A:
9214 parts by weight of n-butyl acrylate
15 parts by weight of triallyl cyanurate
Mixture B:
6600 parts by weight of water
156 parts by weight of the sodium sulphonate of $C_{14}$–$C_{18}$ hydrocarbons.

The reaction mixture is then maintained at 65° C. for a further 4 hours to complete polymerisation. The polymers formed have gel contents of 91% by weight, a degree of swelling of 6.5 and a wide spectrum of rubber particles of 0.2 to 0.9μ.

1.3 Preparation of the graft copolymers
General method

The following are introduced into a reactor and heated to 65° C.:

(a) Parts by weight of latex Initiated with a mixture of
(b) parts by weight of potassium persulphate
(c) parts by weight of water.

The following mixtures are run into the reactor with stirring at 65° C. within 4 hours:
Mixture A:
d parts by weight of Monomer 1
e parts by weight of Monomer 2
Mixture B:
f parts by weight of water
g parts by weight of the sodium sulphonate of $C_{14}$–$C_{18}$ hydrocarbons.

TABLE 1

| | | | | (parts by weight) | | | |
|---|---|---|---|---|---|---|---|
| | a/latex | b | c | d | e | f | g |
| 1.3.1 | 3088/-1.2.1. | 3.5 | 145 | 273 MAM | — | 880 | 5 |
| 1.3.2 | 3088/-1.2.1. | 3.5 | 145 | 76.4 AN | 196.6 S | 880 | 5 |
| 1.3.3 | 13000/-1.2.2. | 18 | 1400 | 311 AN | 799 S | 1200 | 22 |

MAM = methyl methacrylate
AN = acrylonitrile
S = styrene

Polymerisation is then completed by maintaining the reaction mixture at 65° C. for a further 4 hours.

The graft polymer latices 1.3.1–1.3.3. are coagulated by the addition of electrolyte or acid after the addition of an aqueous stabilizer dispersion corresponding to 0.25 to 1 part by weight of a phenolic antioxidant per 100 parts by weight of latex solid. The resulting powders are dried under a vacuum at 70° C.

1.4 Moulding compositions according to the invention

Moulding compositions obtained from X parts by weight of polyvinyl chloride (with a K value of 70[1]) and Y parts by weight of a modifier shown in Table 1 can easily be processed. 1% by weight of Ba/Cd laurate (solid) and 0.2% by weight of ester wax (esterification point 70° to 74° C.) are added as a stabilizer and lubricant combination. The moulding compositions are produced on mixing rollers used at 180° C. for 10 minutes, and test samples are pressed from these compositions at 190° C. Table 2 below describes the mixture prepared and shows some of the advantageous physical properties.

(1) For a definition of the K-value see: H.F., Zeitschrift für Zellulose-Chemie 13 (1932), page 58

TABLE 2

| Example | PVC parts by wt. | Modifier Type | Parts by wt. | Ball indentation hardness DIN 53 456 (MPa 30″) | Impact strength DIN 53 453 kJ/m² R.T. | Impact strength DIN 53 453 kJ/m² −20° C. | Notched impact strength DIN 53 453 kJ/m² R.T. | Notched impact strength DIN 53 453 kJ/m² ±0° C. | Dimensional stability in the heat Vicat B (°C.) DIN 53 460 |
|---|---|---|---|---|---|---|---|---|---|
| 1.4.1. | 90 | 1.3.1. | 10 | 83.2 | n.b.[1] | n.b. | 44 | 5.5 | 80 |
| 1.4.2. | 87.5 | 1.3.1. | 12.5 | 73.6 | ″ | ″ | 69.5 | 8.1 | 78 |
| 1.4.3. | 90 | 1.3.2. | 10 | 84.6 | ″ | ″ | 46.7 | 6.6 | 80 |
| 1.4.4. | 87.5 | 1.3.2. | 12.5 | 76.0 | ″ | ″ | 58.6 | 8.5 | 79 |
| 1.4.5. | 95 | 1.3.3. | 5 | 101.5 | ″ | ″ | 6 | 5 | — |
| 1.4.6. | 92.5 | 1.3.3. | 7.5 | 93.5 | ″ | ″ | 8 | 5 | — |
| 1.4.7. | 90 | 1.3.3. | 10 | 86.5 | ″ | ″ | 21 | 7.5 | — |
| 1.4.8. | 87.5 | 1.3.3. | 12.5 | 77.3 | ″ | ″ | 32 | 11 | — |

[1] n.b. = not broken

We claim:
1. A notched impact resistant thermoplastic moulding composition of
(I) 1.0 to 99% by weight of a thermoplastic vinyl chloride polymer, and

(II) 99 to 1.0% by weight of a particulate graft polymer consisting of a core (a) of a highly cross-linked diene rubber, a first covering (b) of a cross-linked acrylate rubber, and a second covering (c) of a polymer or copolymer of at least one resin-forming monomer selected from the group consisting of styrene, α-methylstyrene, acrylonitrile, methacrylonitrile, acrylic acid esters and methacrylic acid esters.

2. Thermoplastic moulding composition according to claim 1 of
(I) 70 to 98% by weight of polyvinylchloride, and
(II) 30 to 2% by weight of a particulate graft copolymer of (a) crosslinked polybutadiene rubber, a first covering (b) of a trialkylcyanurate crosslinked n-alkylacrylate rubber and a second covering (c) of a copolymer of styrene and acrylonitrile; the weight proportion of a:b being 10:90 to 50:50 and the proportion of (c) in the total graft compound being from 80 to 50% by weight.

* * * * *